United States Patent
Perciot et al.

(10) Patent No.: US 8,593,907 B2
(45) Date of Patent: Nov. 26, 2013

(54) TECHNIQUE AND SYSTEM TO CANCEL NOISE FROM MEASUREMENTS OBTAINED FROM A MULTI-COMPONENT STREAMER

(75) Inventors: Patrick Perciot, Oslo (NO); Ahmet Kemel Ozdemir, Asker (NO)

(73) Assignee: WesternGeco L.L.C., Houston, TX (US)

( * ) Notice: Subject to any disclaimer, the term of this patent is extended or adjusted under 35 U.S.C. 154(b) by 1508 days.

(21) Appl. No.: 11/683,873

(22) Filed: Mar. 8, 2007

(65) Prior Publication Data

US 2008/0219095 A1    Sep. 11, 2008

(51) Int. Cl.
    *G01V 1/00*    (2006.01)
(52) U.S. Cl.
    USPC ............................................. 367/22; 702/17
(58) Field of Classification Search
    USPC ......................... 702/17–18; 181/112; 367/22
    See application file for complete search history.

(56) References Cited

U.S. PATENT DOCUMENTS

| | | |
|---|---|---|
| 3,283,293 A | 11/1966 | Pavey et al. |
| 4,437,175 A | 3/1984 | Berni |
| 4,477,887 A | 10/1984 | Berni |
| 4,486,865 A | 12/1984 | Ruehle |
| 4,520,467 A | 5/1985 | Berni |
| 4,618,949 A | 10/1986 | Lister |
| 4,648,082 A | 3/1987 | Savit |
| 4,827,459 A | 5/1989 | Franklin |
| 4,935,903 A | 6/1990 | Sanders et al. |
| 4,979,150 A | 12/1990 | Barr |
| 4,992,995 A * | 2/1991 | Favret ............................. 367/43 |
| 5,235,554 A | 8/1993 | Barr et al. |
| 5,365,492 A | 11/1994 | Dragoset, Jr. |
| 5,384,753 A | 1/1995 | Sanders |
| 5,392,258 A | 2/1995 | Gabrielson et al. |
| 5,396,472 A | 3/1995 | Paffenholz |
| 5,621,699 A | 4/1997 | Rigsby et al. |
| 5,723,790 A | 3/1998 | Andersson |
| 5,754,492 A | 5/1998 | Starr |
| 5,774,416 A | 6/1998 | Sadek et al. |
| 5,774,417 A | 6/1998 | Corrigan et al. |
| 5,825,716 A | 10/1998 | Starr |
| 5,971,095 A | 10/1999 | Ozbek |
| 5,991,238 A | 11/1999 | Barr |

(Continued)

FOREIGN PATENT DOCUMENTS

| | | |
|---|---|---|
| AU | 720293 | 8/1997 |
| AU | 759810 | 12/1999 |

(Continued)

OTHER PUBLICATIONS

Cooper et al. Seismic Data Gaterhing. Proceedings of the IEEE. vol. 72. No. 10. Oct. 1984.*

(Continued)

*Primary Examiner* — Mark Hellner

(57) ABSTRACT

A technique includes receiving a pressure measurement and a particle motion measurement from at least towed seismic sensor. The pressure measurement contains signal and noise. The technique includes estimating the signal in the pressure measurement and based at least on the estimated signal in the pressure measurement, estimating a noise in the pressure measurement. Noise in the particle motion measurement is predicted based on at least the estimated noise in the pressure measurement, and the particle motion measurement is processed to remove noise based on at least the predicted noise.

24 Claims, 4 Drawing Sheets

(56) References Cited

U.S. PATENT DOCUMENTS

| | | | |
|---|---|---|---|
| 6,021,090 | A | 2/2000 | Gaiser et al. |
| 6,021,091 | A | 2/2000 | Gaiser |
| 6,021,092 | A | 2/2000 | Paffenholz et al. |
| 6,172,940 | B1 | 1/2001 | Mcconnell et al. |
| 6,370,084 | B1 | 4/2002 | Cray |
| 6,446,008 | B1 | 9/2002 | Ozbek |
| 6,453,745 | B1 | 9/2002 | Jalkanen |
| 6,470,275 | B1 * | 10/2002 | Dubinsky .................. 702/9 |
| 6,512,980 | B1 | 1/2003 | Barr |
| 6,529,445 | B1 | 3/2003 | Laws |
| 6,651,007 | B2 | 11/2003 | Ozbek |
| 6,668,228 | B1 * | 12/2003 | Ozbek et al. ............ 702/17 |
| 6,681,887 | B1 | 1/2004 | Kragh et al. |
| 6,684,160 | B1 * | 1/2004 | Ozbek et al. ............ 702/17 |
| 6,751,559 | B2 * | 6/2004 | Fookes et al. ........... 702/17 |
| 6,775,618 | B1 | 8/2004 | Robertsson et al. |
| 6,894,948 | B2 * | 5/2005 | Brittan et al. ............ 367/24 |
| 7,123,543 | B2 | 10/2006 | Vaage et al. |
| 7,319,636 | B2 | 1/2008 | Robertsson et al. |
| 7,379,385 | B2 | 5/2008 | Ferber |
| 7,426,439 | B2 | 9/2008 | Ozdemir et al. |
| 7,466,625 | B2 | 12/2008 | Robertsson et al. |
| 7,599,249 | B2 | 10/2009 | Welker et al. |
| 7,616,522 | B2 | 11/2009 | Rouquette |
| 7,676,327 | B2 | 3/2010 | Ozdemir et al. |
| 2002/0118602 | A1 | 8/2002 | Sen et al. |
| 2003/0048696 | A1 | 3/2003 | Duren |
| 2003/0056424 | A1 | 3/2003 | Mueller |
| 2003/0147306 | A1 | 8/2003 | Robertsson |
| 2003/0176975 | A1 * | 9/2003 | Matteucci et al. ....... 702/17 |
| 2004/0042341 | A1 | 3/2004 | Tenghamn et al. |
| 2004/0141355 | A1 | 7/2004 | Robertsson et al. |
| 2005/0013194 | A1 | 1/2005 | Vaage et al. |
| 2005/0042341 | A1 | 2/2005 | Thomas et al. |
| 2005/0073909 | A1 | 4/2005 | Laws et al. |
| 2005/0090987 | A1 | 4/2005 | Amundsen et al. |
| 2005/0160814 | A1 | 7/2005 | Vaganov et al. |
| 2005/0194201 | A1 | 9/2005 | Tenghamn et al. |
| 2005/0195686 | A1 | 9/2005 | Vaage et al. |
| 2005/0202585 | A1 | 9/2005 | Eskridge |
| 2006/0050611 | A1 | 3/2006 | Borresen |
| 2006/0074562 | A1 | 4/2006 | Amundsen et al. |
| 2006/0076183 | A1 | 4/2006 | Duren et al. |
| 2006/0133202 | A1 * | 6/2006 | Tenghamn ............... 367/24 |
| 2006/0147306 | A1 | 7/2006 | Zheng et al. |
| 2006/0203611 | A1 | 9/2006 | Robertsson et al. |
| 2006/0239117 | A1 | 10/2006 | Singh et al. |
| 2006/0253256 | A1 | 11/2006 | Robertsson et al. |
| 2006/0285435 | A1 | 12/2006 | Robertsson |
| 2007/0189117 | A1 | 8/2007 | Robertsson et al. |
| 2007/0195648 | A1 | 8/2007 | Borgen et al. |
| 2007/0265786 | A1 * | 11/2007 | Ozdemir et al. ............ 702/17 |
| 2008/0089174 | A1 | 4/2008 | Sollner et al. |
| 2008/0270035 | A1 | 10/2008 | Ozdemir et al. |
| 2009/0040872 | A1 | 2/2009 | Pabon et al. |

FOREIGN PATENT DOCUMENTS

| | | |
|---|---|---|
| CA | 2240857 | 7/1997 |
| EP | 0 089 700 | 9/1988 |
| EP | 0 460 789 | 5/1995 |
| EP | 1082623 | 7/2002 |
| GB | 2309082 | 7/1997 |
| GB | 2337592 | 11/1999 |
| GB | 2381314 | 4/2003 |
| GB | 2392495 | 3/2004 |
| GB | 2412732 | 10/2005 |
| GB | 2435513 | 8/2007 |
| WO | 9828636 | 7/1998 |
| WO | 0020895 | 4/2000 |
| WO | 2004046759 | 6/2004 |
| WO | WO 2004/081583 | 9/2004 |
| WO | 2005019868 | 3/2005 |

OTHER PUBLICATIONS

Amundsen, "Wavenumber-based filtering of marine point-source data," *Geophysics*, 58(9):1335-1348, 1993.

Ozbek, "Multichannel adaptive interference canceling," *SEG Technical Program Expanded Abstracts*, 19:2088-2091, 2000.

International Search Report, dated Nov. 25, 2008, for application No. PCT/US2008/055946.

International Search Report and Written Opinion of PCT Application No. PCT/US2008/068226 dated Oct. 10, 2008: pp. 1-15.

International Search Report and Written Opinion of PCT Application No. PCT/US2008/058913 dated Feb. 3, 2010: pp. 1-15.

Amundsen et al., "Rough-sea deghosting of streamer seismic data using pressure gradient approximations," Geophysics, Jan.-Feb. 2005, vol. 70(1): pp. V1-V9.

Richwalski et al., "Practical aspects of wavefield separation of two-component surface seismic data based on polarization and slowness estimates," Geophysical Prospecting, 2000, vol. 48: pp. 697-722.

Vanmanen et al., "D026: Decomposition and Calibration of Multi-Component Data in the Common Shot Domain," EAGE 66th Conference & Exhibition, Jun. 2004: pp. 1-4.

\* cited by examiner

TECHNIQUE AND SYSTEM TO CANCEL NOISE FROM MEASUREMENTS OBTAINED FROM A MULTI-COMPONENT STREAMER

BACKGROUND

The invention generally relates to a technique and system to cancel noise from measurements obtained from a multi-component streamer.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes receiving a pressure measurement and a particle motion measurement from at least towed seismic sensor. The pressure measurement contains a signal and noise. The technique includes estimating the signal in the pressure measurement and based at least on the estimated signal in the pressure measurement, estimating a noise in the pressure measurement. Noise in the particle motion measurement is predicted based on at least the estimated noise in the pressure measurement, and the particle motion measurement is processed to remove noise based on at least the predicted noise.

In another embodiment of the invention, a system includes an interface and a processor. The interface receives data, which is indicative of pressure and particle motion measurements that are obtained from at least one sensor in tow. A processor of the system estimates a signal in the pressure measurement; and based on at least the estimated signal in the pressure measurement, the processor estimates noise in the pressure measurement. The processor predicts noise in the particle motion measurement based on at least the estimated noise in the pressure measurement; and the processor processes the pressure measurement to remove noise based on at least the predicted noise.

Advantages and other features of the invention will become apparent from the following drawing, description and claims.

DETAILED DESCRIPTION

Figure 1:
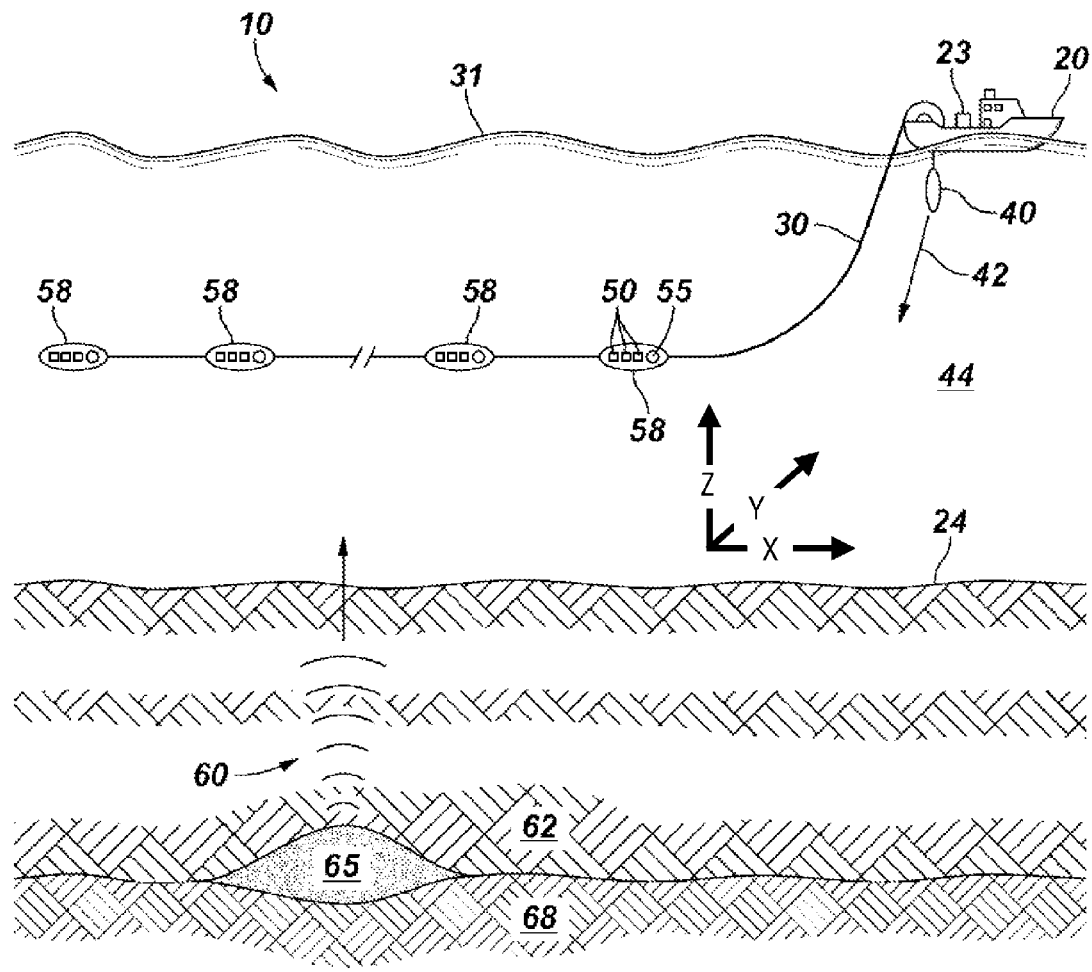
FIG. 1 is a schematic diagram of a marine seismic data acquisition system according to an embodiment of the invention.

FIG. 1 depicts an embodiment 10 of a marine seismic data acquisition system in accordance with some embodiments of the invention. In the system 10, a survey vessel 20 tows one or more seismic streamers 30 (one exemplary streamer 30 being depicted in FIG. 1) behind the vessel 20. The seismic streamers 30 may be several thousand meters long and may contain various support cables (not shown), as well as wiring and/or circuitry (not shown) that may be used to support communication along the streamers 30.

Each seismic streamer 30 contains seismic sensors, which record seismic signals. In accordance with some embodiments of the invention, the seismic sensors are multi-component seismic sensors 58, each of which is capable of detecting a pressure wave field and at least one component of a particle motion that is associated with acoustic signals that are proximate to the multi-component seismic sensor 58. Examples of particle motions include one or more components of a particle displacement, one or more components (inline (x), crossline (y) and depth (z) components, for example) of a particle velocity and one or more components of a particle acceleration.

Depending on the particular embodiment of the invention, the multi-component seismic sensor 58 may include one or more hydrophones, geophones, particle displacement sensors, particle velocity sensors, accelerometers, or combinations thereof.

For example, in accordance with some embodiments of the invention, a particular multi-component seismic sensor 58 may include a hydrophone 55 for measuring pressure and three orthogonally-aligned accelerometers 50 to measure three corresponding orthogonal components of particle velocity and/or acceleration near the seismic sensor 58. It is noted that the multi-component seismic sensor 58 may be implemented as a single device (as depicted in FIG. 1) or may be implemented as a plurality of devices, depending on the particular embodiment of the invention.

The marine seismic data acquisition system 10 includes one or more seismic sources 40 (one exemplary source 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are generated by the sources 40 produce corresponding reflected acoustic signals, or pressure waves 60, which are sensed by the multi-component seismic sensors 58. It is noted that the pressure waves that are received and sensed by the multi-component seismic sensors 58 include "up going" pressure waves that propagate to the sensors 58 without reflection, as well as "down going" pressure waves that are produced by reflections of the pressure waves 60 from an air-water boundary 31.

The multi-component seismic sensors 58 generate signals (digital signals, for example), called "traces," which indicate the detected pressure waves. The traces are recorded and may be at least partially processed by a signal processing unit 23 that is deployed on the survey vessel 20, in accordance with some embodiments of the invention. For example, a particular multi-component seismic sensor 58 may provide a trace, which corresponds to a measure of a pressure wave field by its hydrophone 55; and the sensor 58 may provide one or more traces that correspond to one or more components of particle motion, which are measured by its accelerometers 50.

Figure 4:
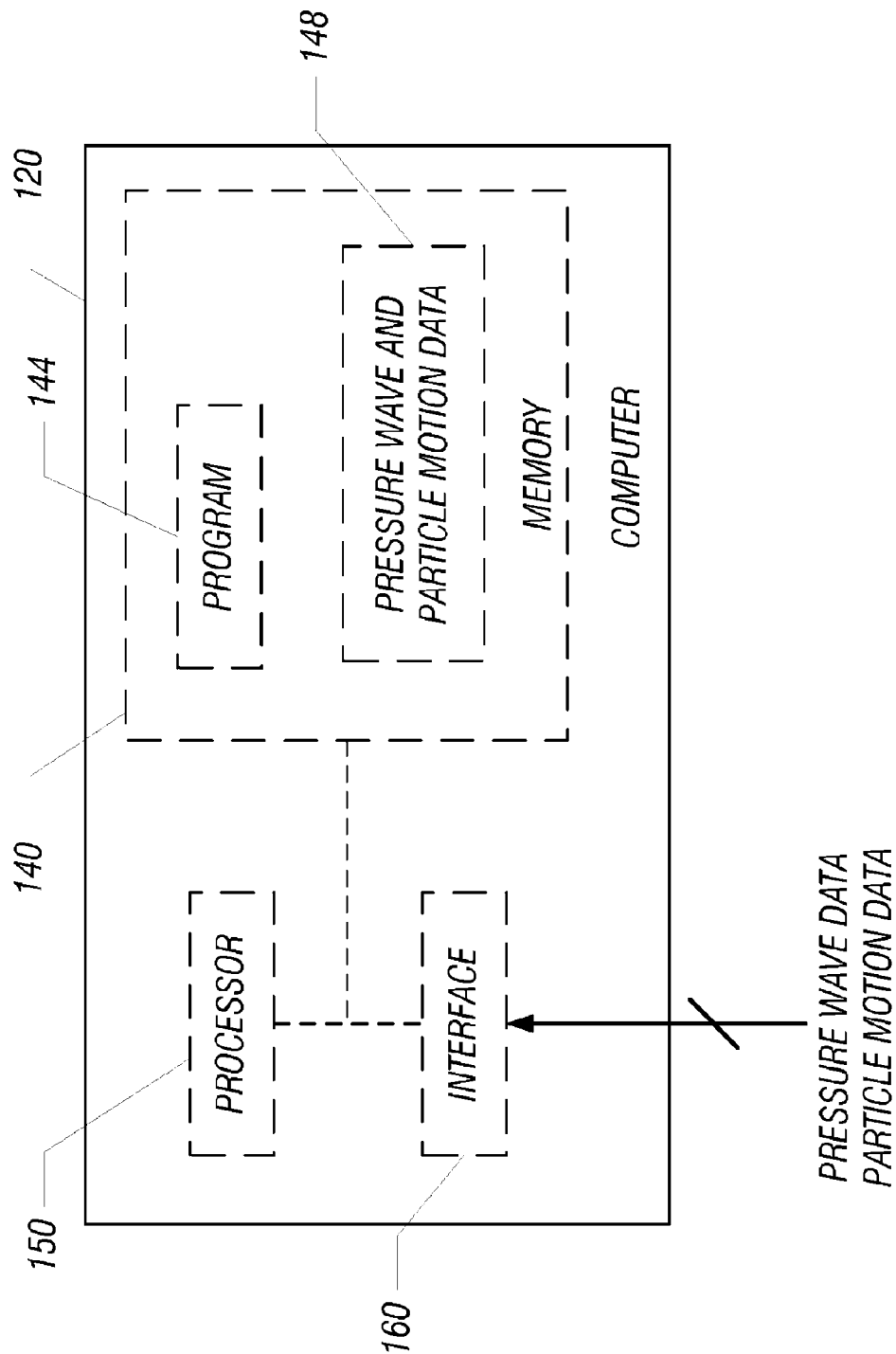
FIG. 4 is a schematic diagram of a seismic data processing system according to an embodiment of the invention.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary seismic data processing system 120 that is depicted in FIG. 4 and further described below) that may be, for example, located on land or on the vessel 20. Thus, many variations are possible and are within the scope of the appended claims.

The down going pressure waves create an interference known as "ghost" in the art. Depending on the incidence angle of the up going wave field and the depth of the streamer cable, the interference between the up going and down going wave fields creates nulls, or notches, in the recorded spectrum. These notches may reduce the useful bandwidth of the spectrum and may limit the possibility of towing the streamers 30 in relatively deep water (water greater than 20 meters (m), for example).

The technique of decomposing the recorded wave field into up and down going components is often referred to as wave field separation, or "deghosting." The particle motion data that is provided by the multi-component seismic sensor 58 allows the recovery of "ghost" free data, which means the data that is indicative of the up going wave field.

Around the notch frequencies, the performance of deghosting algorithms has traditionally been limited by the particle motion sensor noise, as further described in U.S. patent application Ser. No. 11/740,641.

Marine seismic acquisition is subject to many different sources of noise and sensor perturbations, which degrade the fidelity of the acquired pressure signal and reduce the efficiency of seismic acquisition. As examples, some of the typical noises in towed marine acquisition include swell noise, vibration noise, bulge waves (in wet platforms), turbulence and cross-flow noise.

Several conventional techniques have been developed to attenuate the noise that is present in the pressure measurement that is provided by the pressure sensors (such as the hydrophones 55). For example, some of the earliest noise attenuation techniques were based on analog group performing, where a group of receivers were hard-wired to increase the signal-to-noise ratio of data that was provided by the sensors. However, analog group forming presents the challenges of having a fixed, non-frequency-dependent beam response and having the inability to handle sensor-to-sensor sensitivity variations, both of which limit noise attenuation performance. With the advancement of technology, these limitations led to the development of more advanced acquisition systems, which employ point receivers where data is digitized and transmitted to a vessel on a single sensor level. With the deployment of point receiver systems, digital group forming (DGF) techniques have been developed, which provide relatively high signal quality with relatively low noise contamination. Such techniques include, by way of example, LACONA, FXIIR and SWAAT.

It has been discovered through theory analysis and field experiments that particle motion sensors on a towed streamer pick up more noise than pressure sensors. By in-sea processing of closely-spaced particle motion sensors, the noise levels may be reduced significantly, such that particle motion sensors may become quieter than pressure sensors at high frequencies, as discussed in co-pending U.S. patent application Ser. No. 11/432,255. After in-sea processing, on-board processing (by using digital group performing techniques developed for removing noise from the pressure measurement) may provide further noise attenuation. However, the in-sea processing may not be adequate to remove low frequency noise from the particle motion measurement.

It is conceivable that in a streamer of multi-component seismic sensors, the noise records on different sensors are correlated. Hence, to get the full benefit of multi-component measurements, it has been discovered that it may be important for noise attenuation algorithms to take into account the correlation between noises on different sensor types. For example, in U.S. patent application Ser. No. 11/426,058, the signal and noise on the in-line, or x component (see FIG. 1 for orientation), of the particle motion measurement is estimated from the pressure measurement by using equations of motion and assuming that the pressure measurement is noise-free. Then, the noise is removed on y and z components of the particle motion measurement using a transfer function, which predicts the noise on the y and z components based on the noise on the x component. Hence, transfer functions are used, which establishes relationship between the x and y components of the noise as well as x and z components. The transfer functions may be derived either from experiments; analytical analysis of the theory that governs the noise; from numerical simulations; or from a combination of these techniques.

As an alternative to the above-described transfer function technique, in accordance with embodiments of the invention described herein, a reference noise measurement from one type of sensor (such as a hydrophone) is used to cancel the noise on another type of sensor (a particle motion sensor, for example). This approach does not need existence of transfer functions for noise to describe the x to y or x to z components. The approach described herein exploits correlation between noise components that are measured by different sensor types, regardless of the source of the noise (i.e., for acoustic or non-acoustic noise). The noise cancellation technique described herein assumes that the estimated reference noise does not contain any signal content. Otherwise, unacceptable signal cancellation may occur.

Figure 2:
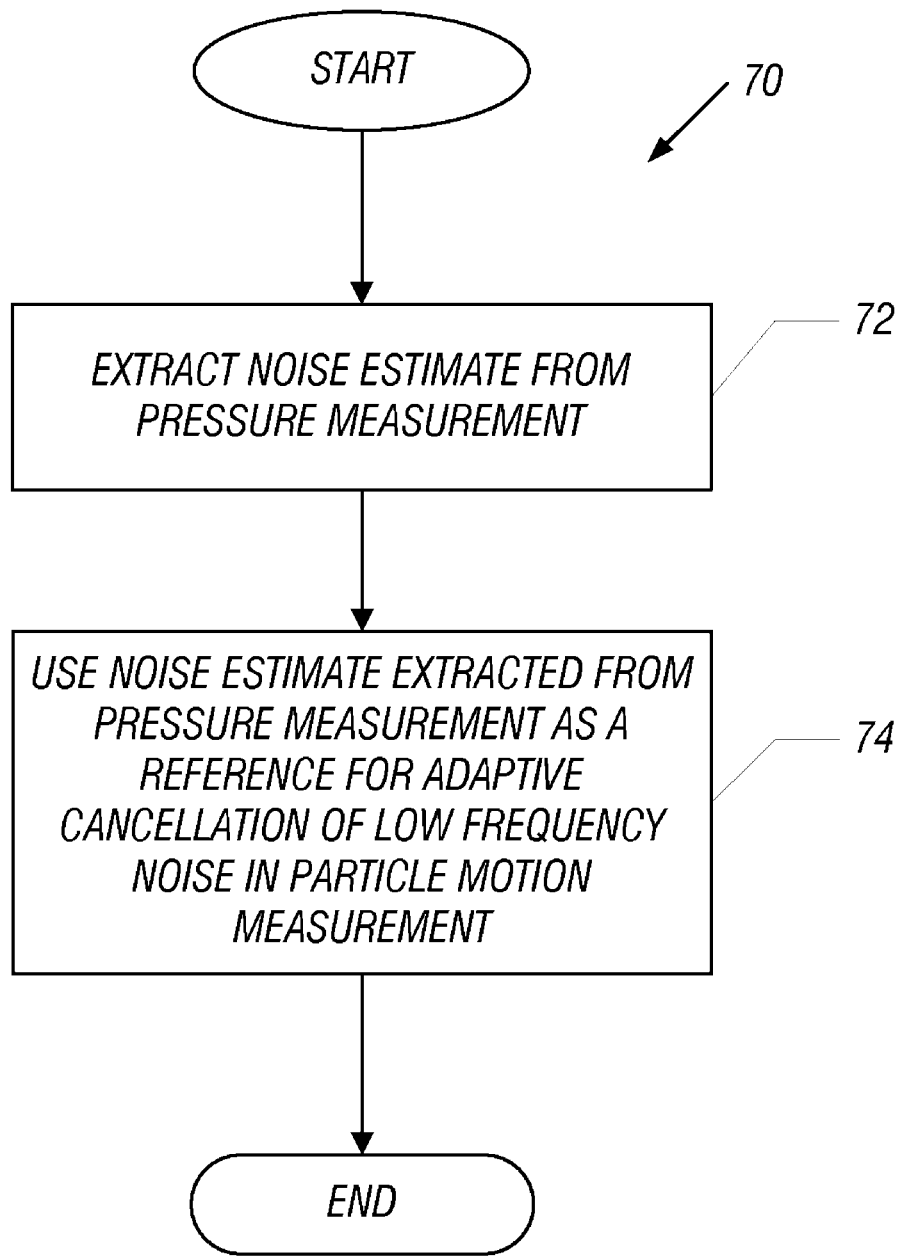
FIG. 2 is a flow diagram depicting a technique to remove noise from a particle motion measurement according to an embodiment of the invention.

As a more specific example, FIG. 2 depicts a technique 70 which may be used to cancel noise from particle motion measurements, in accordance with some embodiments of the invention. Pursuant to the technique 70, a noise estimate is extracted (block 72) from a pressure measurement. This extracted noise estimate is then used (block 74) as a reference for adaptive cancellation of low frequency noise from the particle motion measurement. Aspects of the technique 70 are described in more detailed below.

Seismic data that is acquired from a streamer contains both signal and noise. In other words, there is no continuous recording of a noise-only measurement. However, due to the extraction of the noise estimate from the pressure measurements, the ability to not directly record the noise only measurement that is associated with the particle motion data is not a limitation. In the description below, it is assumed that the noise on the z component of the particle motion measurement is cancelled by using a noise estimate that is derived from the pressure measurement. The generalization to other sets of the sensors is straightforward and thus, is considered to be within the scope of the appended claims.

In the discussion herein, it is assumed that the pressure measurement may be described as follows:

$$P(t,x) = S_p(t,x) + N_p(t,x), \qquad \text{Eq. 1}$$

where "$P(t, x)$" represents the pressure measurement; "$S_p(t, x)$" represents the signal component of the pressure measurement; and "$N_p(t, x)$" represents the noise component of the pressure measurement. The z component of the particle motion measurement may be described as follows:

$$V_z(t,x) = S_z(t,x) + N_z(t,x), \qquad \text{Eq. 2}$$

where "$V_z(t, x)$" represents the z component of the particle velocity measurement; "$S_z(t, x)$" represents the signal component of the particle motion measurement; and "$N_z(t, x)$" represents the noise component of the particle motion measurement.

By using digital group forming (DGF), an estimate of the $S_p(t, x)$ signal (i.e., the signal component of the $P(t, x)$ pressure measurement) may be obtained, as described below:

$$\hat{S}_p(t,x) = DGF_p(P(t,x)). \qquad \text{Eq. 3}$$

Based on the $\hat{S}_p(t,x)$ estimate, the noise component of the $P(t, x)$ pressure measurement may be estimated as follows:

$$\hat{N}_p(t,x) = P(t,x) - \hat{S}_p(t,x). \qquad \text{Eq. 4}$$

The $\hat{N}_p(t,x)$ noise estimate is assumed not to contain any signal content. By using digital group forming, an estimate of the $S_z(t,x)$ signal component of the $V_z(t, x)$ measurement may be derived as follows:

$$\hat{S}_z(t,x) = DGF_z(V_z(t,x)). \qquad \text{Eq. 5}$$

Unlike the $\hat{S}_p(t,x)$ signal estimate for the pressure measurement, the $\hat{S}_z(t,x)$ signal estimate for the particle motion measurement is contaminated by strong low frequency noise (which is not removed by the digital group forming), as described below:

$$\hat{S}_z(t,x) = S_z(t,x) + \overline{N}_z(t,x), \qquad \text{Eq. 6}$$

where "$\overline{N}_z(t,x)$" represents the remaining low frequency noise after the noise attenuation by the digital group forming.

In accordance with embodiments of the invention, which are described herein, the $\hat{N}_p(t,x)$ noise estimate in the pressure measurement (from Eq. 4) is used to predict the low frequency $\overline{N}_z(t,x)$ noise component in the $\hat{S}_z(t,x)$ signal estimate. To this purpose, an adaptive interference cancellation, or prediction, filter like a least mean square (LMS), recursive least square (RLS) or QR-RLS filter may be used. After the estimate (called "$\hat{\overline{N}}_z(t, x)$")

for the $\overline{N}_z(t,x)$ noise is generated using the adaptive interference cancellation filter, the estimate is subtracted from the $\hat{S}_z(t,x)$ particle motion signal estimate to obtain an estimate of the signal content of the particle motion measurement, as set forth below:

$$\hat{S}_{upd,z}(t, x) = \hat{S}_z(t, x) - \hat{\overline{N}}_z(t, x). \qquad \text{Eq. 7}$$

Figure 3:
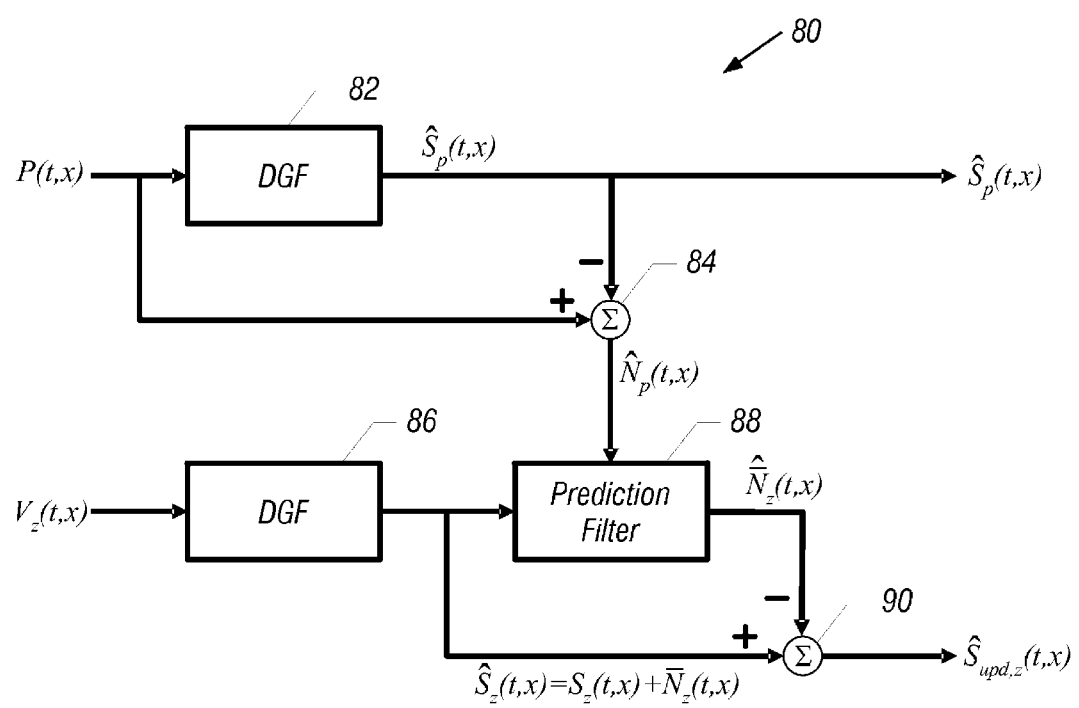
FIG. 3 is a block diagram illustrating a system to remove noise from a particle motion measurement according to an embodiment of the invention.

Consistent with the discussion above, a system 80 that is depicted in FIG. 3 may be used in accordance with embodiments of the invention for purposes of removing noise from pressure and particle motion measurements to recover the signal content from each of these measurements. The system 80 includes a digital group forming block 82 that receives the $P(t, x)$ pressure measurement and produces the $\hat{S}_p(t,x)$ estimate of the signal in the $P(t, x)$ measurement. An adder 84 mathematically combines the $\hat{S}_p(t,x)$ estimate and the $P(t, x)$ pressure measurement to subtract the $\hat{S}_p(t,x)$ estimate from the $P(t, x)$ pressure measurement to derive the $\hat{N}_p(t,x)$ noise estimate, which is estimated noise in the $P(t, x)$ pressure measurement. A digital group forming block 86 processes the $V_z(t, x)$ particle motion measurement to produce the $\hat{S}_z(t,x)$ estimate, which contains the $\overline{N}_z(t,x)$ low frequency noise. For purposes of removing this noise, the $\hat{N}_p(t,x)$ noise estimate and the $\hat{S}_z(t,x)$ estimate are received by an adaptive prediction filter 88 (i.e., an adaptive interference cancellation filter), which based on its inputs provides the $\hat{\overline{N}}_z(t, x)$ estimate of the noise in the $\hat{S}_z(t,x)$ estimate. An adder 90 mathematically combines the $\hat{\overline{N}}_z(t, x)$ and the $\hat{S}_z(t,x)$ estimates to subtract $\hat{\overline{N}}_z(t, x)$ estimate from the $\hat{S}_z(t,x)$ estimate to produce the $\hat{S}_{upd,z}(t,x)$ estimate, which is the estimated signal content of the $V_z(t,x)$ particle motion measurement.

Referring to FIG. 4, in accordance with some embodiments of the invention, a seismic data processing system 120 may perform the technique 70 (FIG. 2), implement system 80 and perform variations thereof for purposes of estimating the signal components in the pressure and particle motion measurements. In accordance with some embodiments of the invention, the system 120 may include a processor 150, such as one or more microprocessors and/or microcontrollers. The processor 150 may be coupled to a communication interface 160 for purposes of receiving seismic data that corresponds to pressure and particle motion measurements. As examples, the interface 160 may be a USB serial bus interface, a network interface, a removable media (such as a flash card, CD-ROM, etc.) interface or a magnetic storage interface (IDE or SCSI interfaces, as examples). Thus, the interface 160 may take on numerous forms, depending on the particular embodiment of the invention.

In accordance with some embodiments of the invention, the interface 160 may be coupled to a memory 140 of the seismic data processing system 120 and may store, for example, various data sets involved with the technique 70 and system 80, as indicated by reference numeral 148. Furthermore, the memory 140 may store program instructions 144, which when executed by the processor 150, may cause the processor 150 to perform one or more of the techniques, such as the technique 70, that are described herein as well as implement the system 80 of FIG. 3.

Other embodiments are within the scope of the appended claims. As an example, in accordance with some embodiments of the invention, the processor of the seismic data processing system may be located on the streamer 30. In other embodiments of the invention, the processor may be located on the towing vessel 20. Thus, many variations are possible and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   receiving a pressure measurement and a particle motion measurement obtained from at least one towed seismic sensor, the pressure measurement containing a signal and noise;
   estimating the signal in the pressure measurement;
   based at least on the estimated signal in the pressure measurement, estimating a noise in the pressure measurement;
   predicting a noise in the particle motion measurement based on at least the estimated noise in the pressure measurement; and
   processing the particle motion measurement to remove noise based at least on the predicted noise.

2. The method of claim 1, wherein the act of estimating the noise in the pressure measurement comprises subtracting the estimated signal in the pressure measurement from the pressure measurement.

3. The method of claim 1, wherein the act of processing the particle motion measurement produces low noise particle motion data.

4. The method of claim 1, wherein the act of estimating the signal in the pressure measurement comprises using digital group forming to estimate the signal.

5. The method of claim 1, wherein the act of processing the particle motion measurement to remove noise comprises estimating a signal in the particle motion measurement.

6. The method of claim 1, wherein the estimated signal in the particle motion data contains low frequency noise.

7. The method of claim 5, wherein the act of processing the particle motion measurement to remove noise further comprises:
   subtracting the predicted noise in the particle motion measurement from the estimated signal in the particle motion measurement.

8. The method of claim 5, wherein the act of estimating the signal in the particle motion measurement comprises using digital group forming.

9. The method of claim 1, wherein the act of predicting the noise in the particle motion measurement comprises:
   processing the estimated noise in the pressure measurement with a prediction filter.

10. The method of claim 9, wherein the prediction filter comprises one of the following:
    a least mean square filter, a recursive least square filter and an QR-RLS filter.

11. The method of claim 1, wherein the act of processing the particle motion measurement to remove noise comprises removing low frequency noise that cannot be substantially removed by digital group forming.

12. A system comprising:
    an interface to receive data indicative of a pressure measurement obtained from at least one sensor in tow and data indicative of a particle motion measurement obtained from at least one sensor in tow; and
    a processor to:
       estimate a signal in the pressure measurement;
       based at least on the estimated signal in the pressure measurement, estimate a noise in the pressure measurement;
       predict a noise in the particle motion measurement based on at least the estimated noise in the pressure measurement; and
       process the particle motion measurement to remove noise based on at least the predicted noise.

13. The system of claim 12, wherein the processor subtracts the estimated signal in the pressure measurement from the pressure measurement in the generation of the estimate of the noise in the pressure measurement.

14. The system of claim 12, wherein the processor generates low noise particle motion data as a result of the processing of the particle motion data to remove noise.

15. The system of claim 12, wherein the processor uses digital group forming to estimate the signal in the pressure measurement.

16. The system of claim 12, wherein the processor estimates a signal in the particle motion measurement in the processing of the particle motion measurement to remove noise.

17. The system of claim 16, wherein the processor subtracts the predicted noise in the particle motion measurement from the estimated signal in the particle motion measurement to generate low noise particle motion data.

18. The system of claim 16, wherein the processor uses digital group forming to estimate the signal in the particle motion measurement.

19. The system of claim 12, wherein the processor uses a prediction filter to predict the noise in the particle motion measurement.

20. The system of claim 19, wherein the prediction filter comprises one of the following:
    a least mean square filter, a recursive least square filter and an QR-RLS filter.

21. The system of claim 12, wherein the processor in the processing of the particle motion measurement to remove noise removes low frequency noise that cannot be substantially removed by digital group forming.

22. The system of claim 12, further comprising:
    a streamer,
    wherein the processor is disposed in the streamer.

23. The system of claim 12, further comprising:
    a towing vessel to tow said at least one sensor.

24. The system of claim 23, wherein the processor is located on the towing vessel.

* * * * *

UNITED STATES PATENT AND TRADEMARK OFFICE
CERTIFICATE OF CORRECTION

| | | |
|---|---|---|
| PATENT NO. | : 8,593,907 B2 | Page 1 of 1 |
| APPLICATION NO. | : 11/683873 | |
| DATED | : November 26, 2013 | |
| INVENTOR(S) | : Patrick Perciot et al. | |

It is certified that error appears in the above-identified patent and that said Letters Patent is hereby corrected as shown below:

Title page, item [75], inventor: second inventor's name should be Ahmet Kemal Ozdemir.

Signed and Sealed this
Nineteenth Day of January, 2016

Michelle K. Lee
*Director of the United States Patent and Trademark Office*